US008674858B2

(12) United States Patent
Mitchem et al.

(10) Patent No.: US 8,674,858 B2
(45) Date of Patent: Mar. 18, 2014

(54) METHOD FOR COMPRESSION AND REAL-TIME DECOMPRESSION OF EXECUTABLE CODE

(75) Inventors: Jeff Mitchem, Broomfield, CO (US); Wim Schonkeren, Lommel (BE); Arnaud Gouder de Beauregard, Susteren (NL)

(73) Assignee: Marvell World Trade Ltd. (BB)

( * ) Notice: Subject to any disclaimer, the term of this patent is extended or adjusted under 35 U.S.C. 154(b) by 39 days.

(21) Appl. No.: 13/428,645

(22) Filed: Mar. 23, 2012

(65) Prior Publication Data

US 2012/0256771 A1   Oct. 11, 2012

Related U.S. Application Data

(60) Provisional application No. 61/474,183, filed on Apr. 11, 2011.

(51) Int. Cl.
 *H03M 7/30*   (2006.01)
(52) U.S. Cl.
 USPC .............................................. 341/87; 726/23
(58) Field of Classification Search
 USPC ............... 341/87; 726/23; 345/555; 712/200; 358/1.13
 See application file for complete search history.

(56) References Cited

U.S. PATENT DOCUMENTS

| 7,669,195 | B1 | 2/2010 | Qumei |
| 2007/0083571 | A1 | 4/2007 | Meller et al. |
| 2009/0237698 | A1 | 9/2009 | Huang |
| 2009/0260084 | A1* | 10/2009 | Naccache ................ 726/23 |

FOREIGN PATENT DOCUMENTS

| DE | 102007045987 A1 | 2/2009 |
| EP | 2017726 A2 | 1/2009 |
| WO | 2007005143 A1 | 1/2007 |

OTHER PUBLICATIONS

Patent Cooperation Treaty (PCT), International Search Report and Written Opinion from co-pending PCT International Patent Application No. PCT/US2012/030345 (International Filing Date: Mar. 23, 2012), having a Date of Mailing of Jun. 18, 2012 (13 pgs).
Salomon David, "Data Compression. The Complete Reference Passage," Nov. 1, 2009, Data Compression. The Complete Reference Springer Verlag, DE pp. 189-192.

* cited by examiner

*Primary Examiner* — Joseph Lauture

(57) ABSTRACT

Systems, methods, and other embodiments associated with compression and real-time decompression of executable code are described. According to one embodiment, an apparatus includes a memory that stores compressed blocks of data. The data is executable code for a processing element. The apparatus also includes a decompression logic. The decompression logic receives a request from the processing element for data and determines a compressed block that stores the data. The compressed block is decompressed to produce an uncompressed block. The decompression logic then provides the requested data to the processing element. In one embodiment an uncompressed block has a predetermined fixed block size. The predetermined fixed block size is selected based on at least one of an amount of uncompressed data, a desired compression ratio, and a desired access time.

20 Claims, 8 Drawing Sheets

METHOD FOR COMPRESSION AND REAL-TIME DECOMPRESSION OF EXECUTABLE CODE

CROSS REFERENCE TO RELATED APPLICATIONS

This patent disclosure claims the benefit of U.S. Provisional Application No. 61/474,183 filed on Apr. 11, 2011, which is hereby wholly incorporated by reference.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Microprocessors and other processing elements access executable code. Executable code is thus stored in memory that is readily accessible to the microprocessor. In system-on-chip microprocessor products, the executable code is typically stored in Dynamic Random Access Memory (DRAM) or Synchronous Random Access Memory (SRAM). DRAM is well suited for storing executable code because it is relatively low cost and has a high density of memory cells, so that it takes up less space. One drawback to using DRAM to store executable code is that the DRAM is typically a separate component from the system-on-chip, necessitating external connections and increasing the overall footprint of the system-on-chip. SRAM or DRAM can also be included within the system-on-chip, eliminating the need for a separate component. This greatly increases the size, and hence cost of the system-on-chip.

In information theory and computer science, data compression involves encoding data using fewer bits than the data's original representation would use. Compression reduces the storage space needed to store the data. However, compressing data may also result in the necessity of data decompression, requiring additional time and processing. During decompression, the data is decoded to return the data to the original representation. Conventionally, compression and decompression are performed as quickly as possible to limit the consumption of resources and interference with a user. To this end, popular compression algorithms (e.g., LZ77) attempt to balance speed of compression with the effectiveness of the compression. Thus, while being capable of high speed performance, these compression algorithms may not provide maximal compression.

SUMMARY

In one embodiment, an apparatus includes a memory that stores compressed blocks of data. The data is executable code for a processing element. The apparatus also includes a decompression logic. The decompression logic receives a request from the processing element for data and determines a compressed block that stores the data. The compressed block is decompressed to produce an uncompressed block. The decompression logic then provides the requested data to the processing element.

In one embodiment an uncompressed block has a predetermined fixed block size. The predetermined fixed block size is selected based on at least one of an amount of uncompressed data, a desired compression ratio, and a desired access time.

In another embodiment, a method includes storing data in compressed blocks. The data is executable code for a processing element. A request is received from the processing element for data. It is then determined which compressed block stores the data. The compressed block is decompressed to produce an uncompressed block. The requested data is provided to the processing element.

In one embodiment uncompressed blocks are of a predetermined fixed block size. To determine which compressed block stores the data, the address of the requested uncompressed block is divided by the fixed block size to determine a block number that identifies a compressed block that stores the data.

In another embodiment a pair of bits of uncompressed executable code is selected. It is determined whether the pair of bits has been previously copied to a copy bin. If the pair of bits has not been previously copied to the copy bin, the pair of bits is copied to the copy bin. If the pair of bits has been previously copied to the copy bin, an additional bit is added to form a segment. It is then determined if the segment has been previously copied to the copy bin. If the segment has not been previously copied to the copy bin, a pointer pointing to a location of the pair of bits in the copy bin is stored in a compressed block. If the segment has been previously copied, an additional bit is added to the segment to form a longer segment, until the longer segment is determined as not having been copied previously. A pointer is stored in the compressed block. The pointer points to the longest segment determined as having been previously copied to the copy bin.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Described herein are examples of systems, methods, and other embodiments associated with compression and real-time decompression of executable code. In some circumstances, it is desirable to store executable code in on-chip memory (e.g., static random-access memory (SRAM), flash memory). For example, some system-on-chip products enable execution of code that is stored in on-chip flash memory. However, the amount of executable code may exceed the capacity of the on-chip flash memory. Flash memory is relatively costly and also requires more space per bit of storage than other types of memory. Rather than incurring the cost and space of providing additional on-chip memory, according to the systems and methods described herein, the executable code is compressed to fit in the available flash memory. When the executable code is requested by the system-in-chip processing element, the compressed executable code is decompressed so that is available virtually immediately (e.g., in "real time") to the processing element. Other system-on-chip products store code in flash memory in compressed form, then download and decompress the code before storing it in on-chip SRAM or DRAM. The code is then executed from the on-chip SRAM or DRAM. This requires a large amount of on-chip SRAM or DRAM which greatly increases the size and cost of the system-on-chip.

When compressed data corresponds to executable code for a processing element, the compression is performed once while the decompression is performed repetitively and "on-the-fly". Accordingly, while the decoding should be performed quickly, the compression may not be subject to such stringent speed constraints. The compression operation may be allowed additional time to most effectively compress the executable code. The compression ratio is increased using compression techniques described herein, that provide layered procedures to tightly compress the executable code. Increasing the compression ratio allows the compressed executable code to fit within a limited amount of memory and facilitates storing the compressed executable code in on-chip memory.

When the executable code is requested for processing, a compressed block storing the executable code is decompressed and the executable code is processed in real time. The compression and decompression techniques described herein facilitate decompressing executable code and providing it to the processing element in real time. In this manner, a processing element is able to process executable code in real time without requiring additional on-chip memory or sacrificing speed. The systems and methods herein are described in the context of a system-on-chip that stores executable code in compressed form in on-chip flash memory. However, compression and real time decompression of executable code, or any other type of data, as described herein may be performed in any number of processing environments and with any number of memory types.

Figure 1:
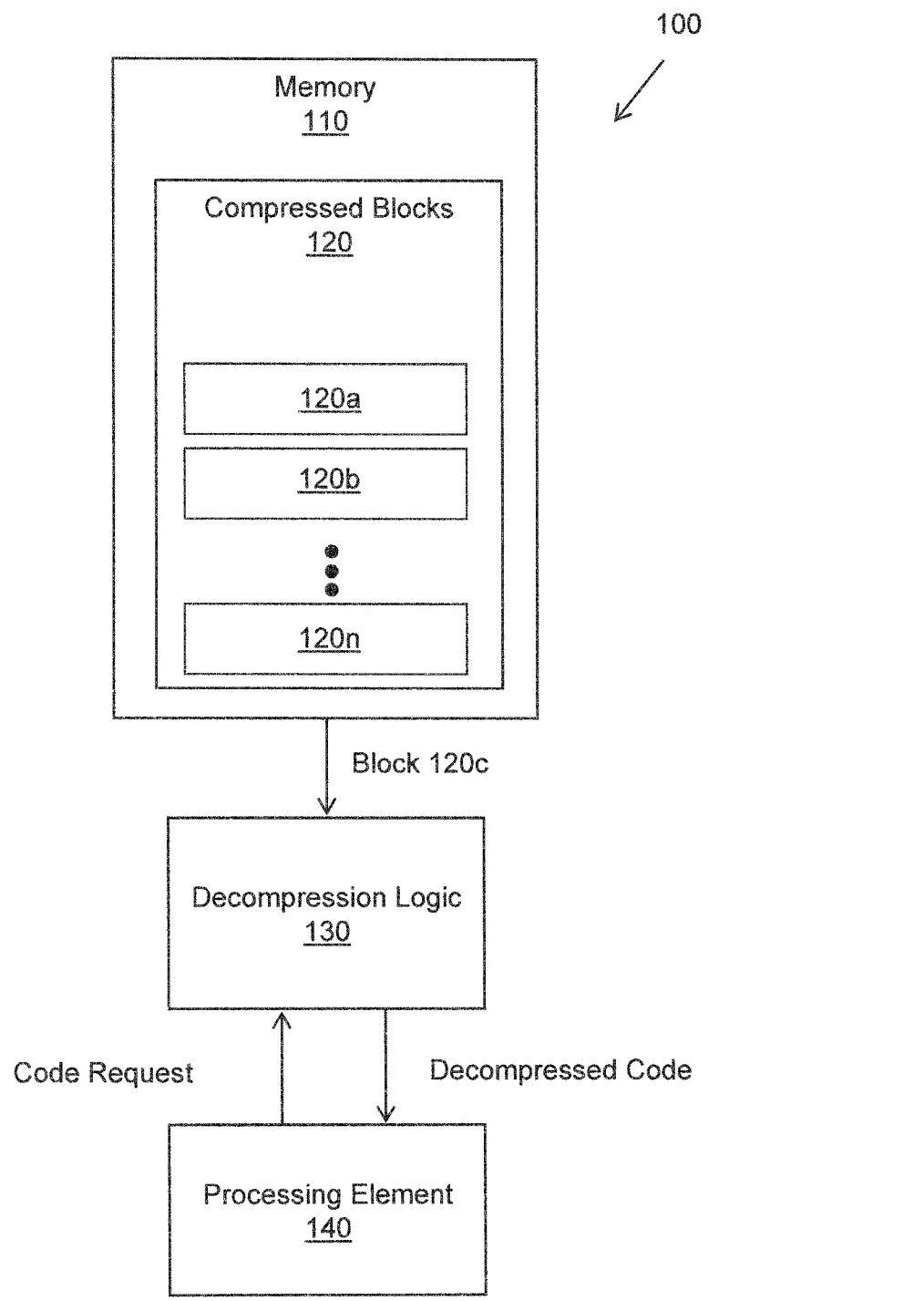
FIG. 1 illustrates one embodiment of an apparatus associated with compression and real-time decompression of executable code.

With reference to FIG. 1, one embodiment of an apparatus 100 is shown that is associated with real-time decompression of executable code. The executable code is stored in a memory 110 as compressed blocks 120a-120n. The executable code may include processing instructions, user data, or system code. When the executable code is requested by a processing element 140, the a decompression logic 130 selects a compressed block (e.g., compressed block 120c) storing the executable code. The executable code is compressed into the compressed blocks 120 individually. Therefore, the selected compressed block 120c can be decompressed independently by the decompression logic 130 to retrieve the requested executable code. The compressed block 120c is sent to a decompression logic 130 to be decompressed. Once the compressed block has been decompressed, the decompressed block is returned to processing element 140 by the decompression logic 130.

Figure 2A:
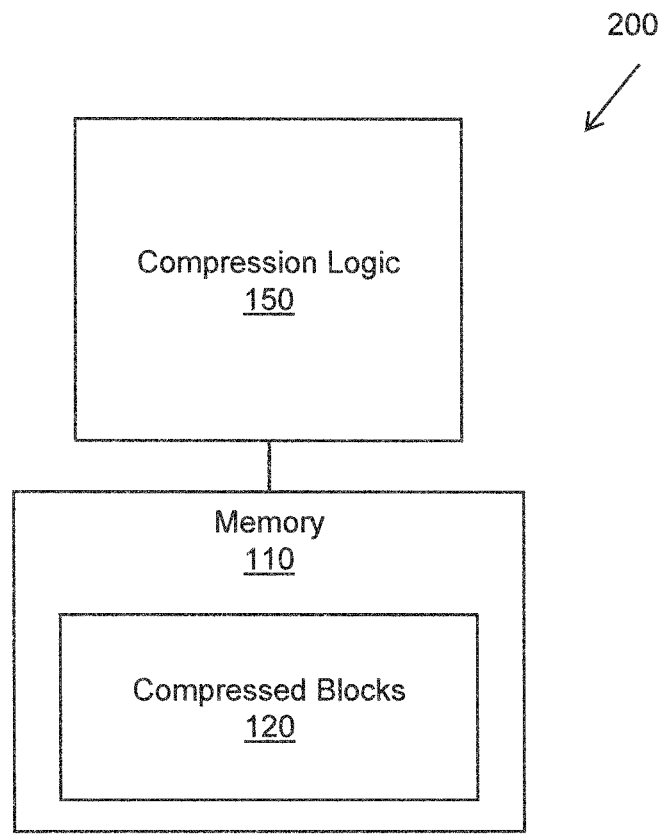
FIG. 2A illustrates one embodiment of an apparatus associated with compression and real-time decompression of executable code.

FIG. 2A illustrates one embodiment of an apparatus 200 associated with compression and real-time decompression of executable code. FIG. 2 includes the memory 110 having the compressed blocks 120 shown in FIG. 1. The memory 110 operates in a similar manner as described with respect to FIG. 1. The apparatus 200 also includes a compression logic 150 to compress executable code into the compressed blocks 120. The compression logic 150 is configured to copy bits from uncompressed blocks and store them in corresponding compression blocks. In one embodiment, the compression logic performs a compression method outlined in FIG. 3. Unlike many compression algorithms, the compression method performed by the compression logic 150 is not limited by time constraints. While this makes the compression method more time consuming than other methods, it provides a tight compression of the executable code. One embodiment of a configuration of compressed code as stored in memory is illustrated in FIG. 4.

Figure 2B:
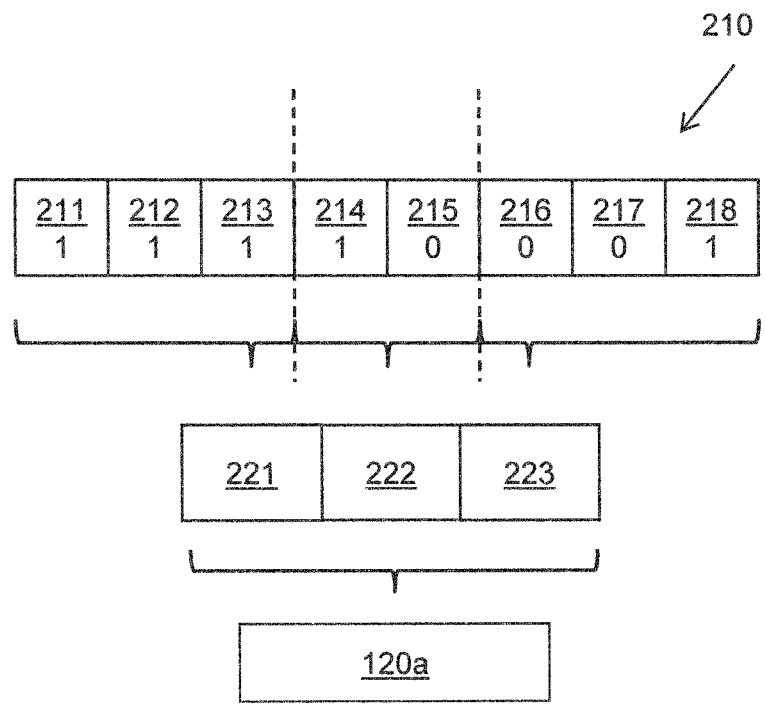
FIG. 2B illustrates one embodiment of executable code being compressed into a compressed block.

FIG. 2B illustrates one embodiment of executable code 210 being compressed into a compressed block 120a. The executable code 210 include bits or words 211-218. A bit contains a value. The bit 211 has a value 1, the bit 212 has a value 1, and the bit 213 has a value 1. The bits 211-213 for a segment 221. A segment represents a maximal length of bits that has already been stored in memory. Thus, a segment of bits having values 1, 1, and 1, like the segment 221, has been previously stored but the bits 211-214 have not.

A bit 214 has a value 1 and a bit 215 has a value 0. A segment having the values 1 followed by 0 has been previously stored. Thus, the bit 214 and the bit 215 form a segment 222. A bit 216 has a value 0, a bit 217 has a value 0, and a bit 218 has a value 1. A segment having values 0, followed by 0, followed by 1 has been previously stored in the memory. Therefore, bits 216-218 form a segment 223. Segments 221, 222, and 223 are stored as compressed block 120a.

Figure 2C:
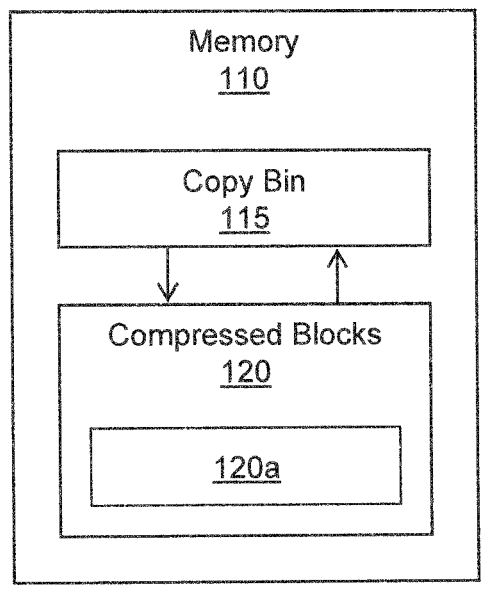
FIG. 2C illustrates one embodiment of an apparatus associated with compression and real-time decompression of executable code.

FIG. 2C illustrates one embodiment of a memory 110 associated with compression and real-time decompression of executable code. Segments are stored in an area of the memory 110 allocated as a copy bin 115. To determine whether a segment has been previously saved to the memory 110, the segment of bits is searched for in the copy bin 115. Once a segment is identified as having the maximum number of bits previously stored in the copy bin 115, the segment is used for block compression.

Figure 3:
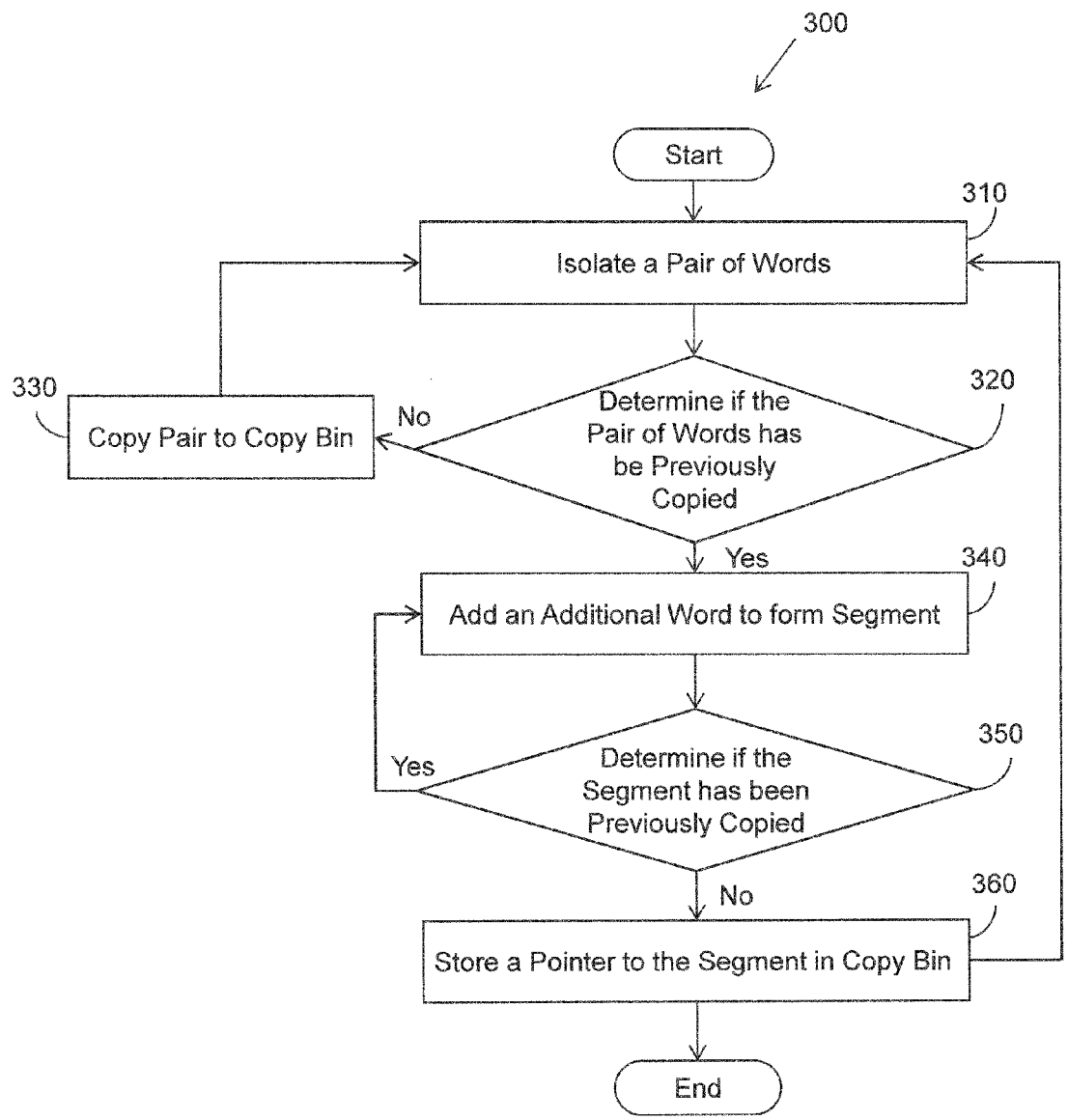
FIG. 3 illustrates one embodiment of a method associated with compression and real-time decompression of executable code.

FIG. 3 illustrates one embodiment of a method associated with compression of executable code. To compress the executable code into compressed blocks, the method includes at 310 isolating a pair of words including a first word and a second word of executable code. A word includes at least one bit. At 320, it is determined whether the pair of words has been previously copied. If the pair has not been previously copied, the pair is considered a literal item. Literal items are copied to a copy bin for storage. Accordingly, the pair is copied to the copy bin at 330 and the method returns to 310. If the pair of words has been previously copied, the pair of words is considered a copy item. To compress the data, a pointer is stored that points to the longest string of copy items available. Accordingly, to determine whether a pair represents the longest string of copy items that can be constructed, at 340 the next word in the executable code is added to the pair to form a three word segment.

At 350, it is determined whether the segment has been previously copied. In the present example, it is determined whether the three word segment is a copy item. If three word segment has not been previously copied to the copy bin, the pair represents the longest possible segment of previously copied words. Therefore, at 360, a pointer to the copy bin pointing back in the copy bin to the last occurrence of the pair is stored. The pointer includes an offset and a count. The offset indicates the location of the previously copied pair in the copy bin. The count indicates the length, in words, of the copy item. In this example, the copy item includes the first word and the second word of executable code. Accordingly, the count for the copy item is two words.

Conversely, if at 350, if it is determined that the segment is present in the copy bin as a copy item, the method 300 returns to 340 to add an additional word to the segment. In the example discussed, if the three word segment has been previously copied to the copy bin, the next word in the executable code is added to the pair to form a four word segment at 340. Thus, as it is determined that a segment has been previously copied to the copy bin additional words are added until the segment is not found in the copy bin. Once a segment is not found in the copy bin, it is determined that the segment absent the last word added is the longest possible segment. In this manner, the compression method creates copy items of maximal length to enhance the amount of compression achieved. The maximum length of a copy item may have a predetermined limit. In one embodiment, the maximum length of a copy item is 23 words.

Figure 4A:
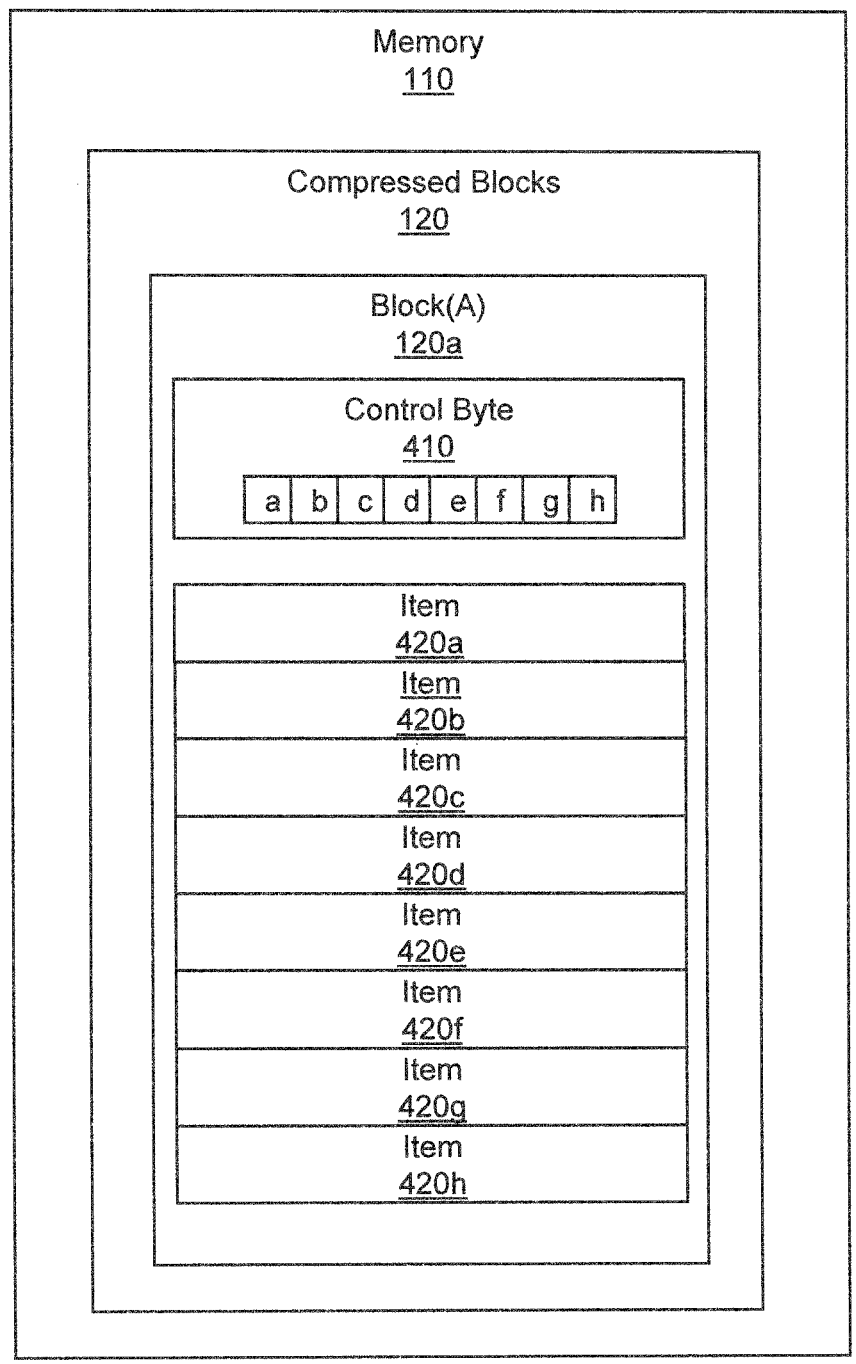
FIG. 4A illustrates one embodiment of a memory associated with compression and real-time decompression of executable code

FIG. 4A illustrates one embodiment of a memory that stores compressed executable code. The memory 110 may be a flash memory, quad-serial flash memory, electrically erasable programmable read-only memory (EEPROM), SRAM, or other storage device. The memory 110 stores compressed executable code in compressed blocks. Each compressed block is comprised of at least one group. The number of groups in a block varies with the compressability of the block. For clarity, compressed block 120a is illustrated with a single group. The group contains a control byte 410, having 8 bits a-h, and up to eight (8) items 420a-420h. Each bit in the control byte 410 corresponds to one of the eight items 420a-420h. For example, bit (a) in the control byte 410 corresponds to item 420a, bit (b) in the control byte corresponds item 420b, and so on.

Each bit in the control byte 410 indicates whether the corresponding item is a literal item that has not been copied previously or a copy item that has been copied previously. For example, a "0" value for bit (a) indicates that item 420a is a literal item, while a "1" indicates the item 420a is a copy item. The compressed blocks 120 may be additionally compressed by Huffman encoding of nibbles of the control byte 410. A nibble is a four bit portion of a byte. A nibble of a control byte may be Huffman encoded into a field that contains 2 to 5 bits, such that the encoded control byte has a length of 4 to 10 bits. Likewise, literal items may be Huffman encoded. Huffman encoding identifies frequently encoded nibbles. The frequently encoded nibbles may be stored in a Huffman table based on the presence of the frequently encoded nibbles or may be preprogrammed into a Huffman table. Huffman encoding is one example of a technique used to further compress the compressed blocks. Alternative techniques may be used.

Groups are not aligned on byte or nibble boundaries. Thus, after encoding the control byte 410, literal items, and copy items into a group, the group will have a length that is not necessarily a multiple of 4 or 8. The control byte 410, literal items, and copy items are packed together as one long string of bits. However, blocks are aligned on byte boundaries. Thus, bits with a predetermined value, such as "0" are inserted at the end of a block to complete a block, so that the following block will start on a byte boundary.

Figure 4B:
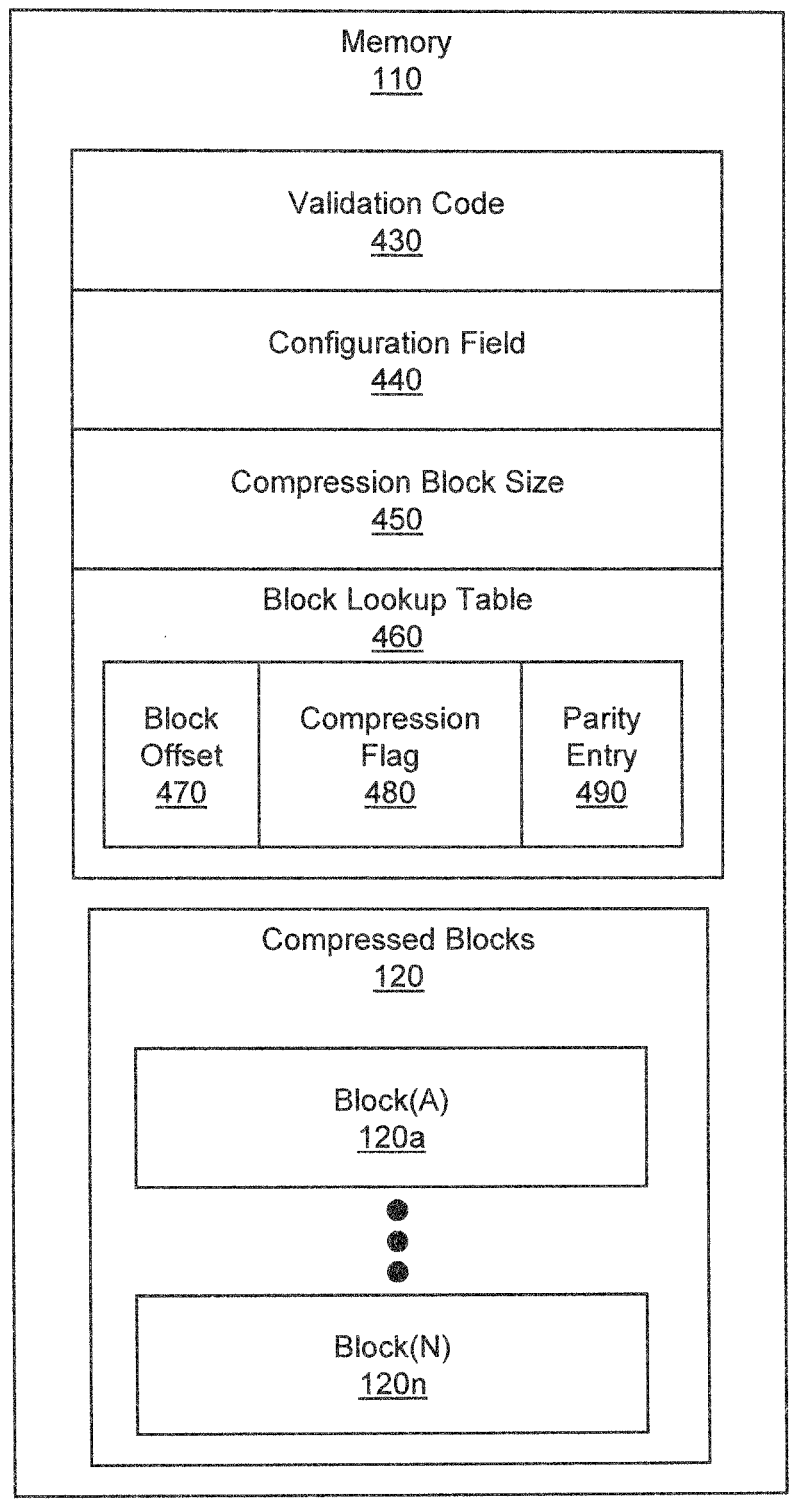
FIG. 4B illustrates one embodiment of a memory associated with compression and real-time decompression of executable code.

FIG. 4B illustrates one embodiment of a memory that stores compressed executable code. In addition to storing compressed blocks 120, the memory 110 stores data about the compressed blocks 120. The memory 110 stores a validation code 430, a configuration field 440, a compression block size 450, and block lookup table 460. The validation code 430 is an eight bit code that indicates whether the memory 110 contains valid data.

The configuration field 440 is a five bit field that provides information about the compression procedure. In one embodiment, the first two bits of the five bit configuration field 440 indicate the amount of data and executable code stored in the memory 110. The third bit of the five bit configuration field 440 indicates whether checksum bytes are being used. A checksum byte is computed to detect an error introduced during a block's transmission or storage. For example, a "1" in this field indicates that a checksum byte is included at the end of a compressed block. The fourth bit of the five bit configuration field 440 indicates whether the executable code is stored in an uncompressed form or a compressed form. The fifth bit of the five bit configuration field 440 indicates whether nibble encoding has been employed. Nibble encoding is a fixed four bit length encoding that may, based on the executable code, improve compression.

The compression block size 450 specifies the fixed block size of uncompressed blocks. Uncompressed blocks may have a fixed size so that the compressed blocks can be readily located in the memory 110. The size of the uncompressed block affects the compression ratio and the access time of a compressed block. A smaller uncompressed block size may have better access time, but may provide poor compression as compared to a bigger uncompressed block size. Bigger uncompressed blocks typically have longer access time but better compression. In one example, the memory 110 is configured to determine the fixed block size by computing the smallest block size that achieves a predetermined level of compression. Alternatively, the memory 110 may be preprogrammed with a fixed block size.

In one embodiment, block size may be indicated in the compression block size 450 with a three bit code. In one example, a three bit binary code "000" indicates that compression will not be used, "001" indicates a fixed block size of 128 bytes, "010" indicates a fixed block size of 256 bytes, "011" indicates a fixed block size of 512 bytes, "100" indicates a fixed block size of 1024 bytes, and "101" indicates a fixed block size of 2048 bytes. Alternatively, the compression block size 450 of memory 110 may also indicate that a variable uncompressed block size was used. In the event that a variable uncompressed block size was used, additional data may be included in a lookup table to locate the compressed blocks.

To locate blocks in the memory 110, the memory includes a block lookup table 460. The block lookup table 460 includes a block offset 470, a compression flag 480, and a parity entry 490. Uncompressed executable code is divided into N uncompressed blocks. Uncompressed blocks of executable code are assigned a block number (e.g., 1, 2, 3 . . . N) that will remain the block number once the uncompressed blocks have been compressed. For example, compressed block (A) 120a corresponds to uncompressed block number 1 and compressed block (N) 120n corresponds to uncompressed block number N. In the described embodiment, the uncompressed blocks are a fixed size. Therefore, a starting address for a block can be determined by dividing the total amount of uncompressed data by that uncompressed block's number. The starting address of an uncompressed block is stored as the offset address 470.

Some uncompressed blocks expand when compressed rather than being reduced in size. Rather than storing the larger compressed blocks, blocks that grow in response to being compressed are stored in uncompressed form. Compression flag 480 indicates whether a block is stored in compressed form or uncompressed form. The compression flag 480 is appended to the offset address 470.

Parity entry 490 provides error detection for the block lookup table 460. The parity entry 490 is comprised of two bits that provide odd parity based on the offset address 470. While for purposes of clarity a specific number of bits have been given for different entries such as the eight bit validation code, five bit configuration field, and two bit parity entry, more or fewer bits may be used. The numbers of bits are given to illustrate the possible form and function of memory 110, but are not intended to be limiting.

Figure 5:
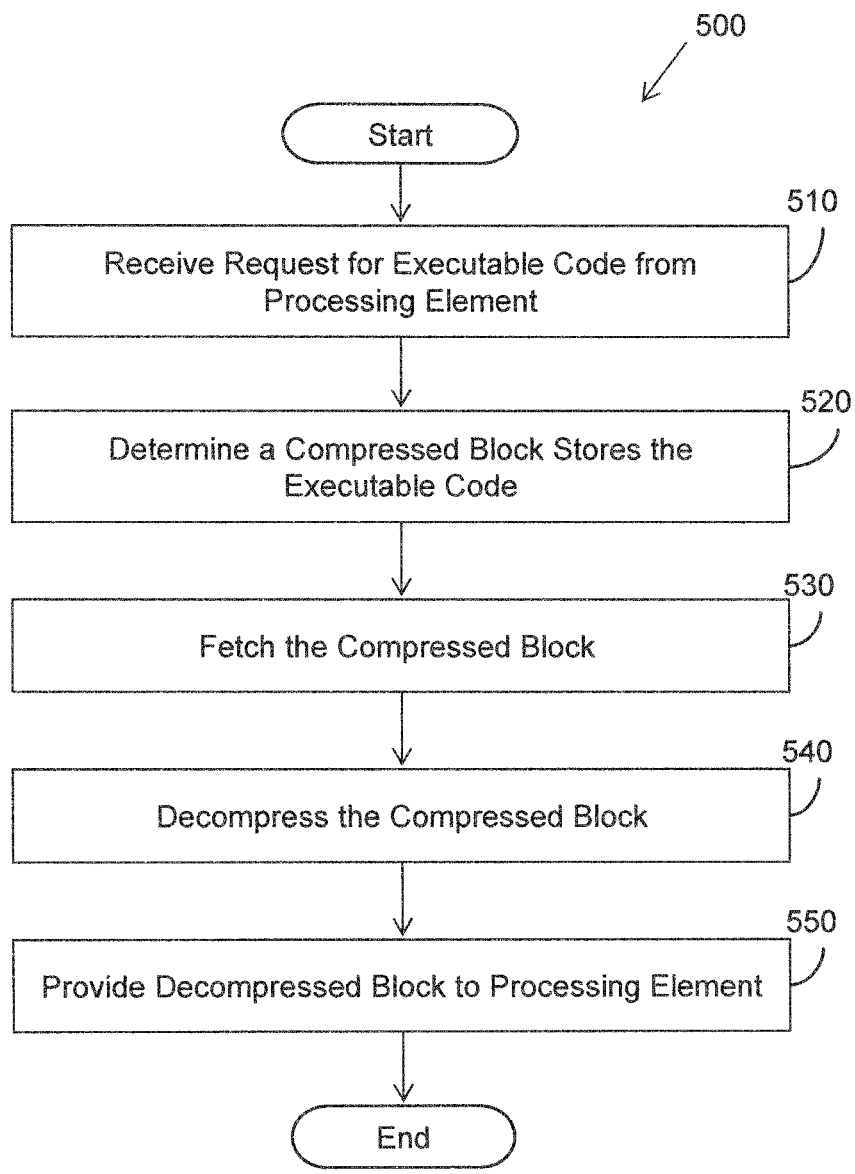
FIG. 5 illustrates one embodiment of a method associated with compression of executable code that facilitates real-time decompression of the executable code.

FIG. 5 illustrates one embodiment of a method associated with compression of executable code that facilitates real-time decompression of the executable code. At 510, a request is for executable code is received from a processing element. The processing element may be a system-on-chip configured to access a flash memory for executable code.

At 520, the method includes determining which compressed block stores the requested executable code. To determine which compressed block stores the executable code, the uncompressed block that stored the executable code is identified. The uncompressed block is identified by the block number of the uncompressed block. The compressed block storing the executable code is identified in the block lookup table using the block number and block offset. Once the correct compressed block is identified, at 530 the compressed block is fetched from memory. At 540, the decompression logic decompresses the compressed block. The decompressed block containing the executable code is returned to the processing element at 550.

Figure 6:
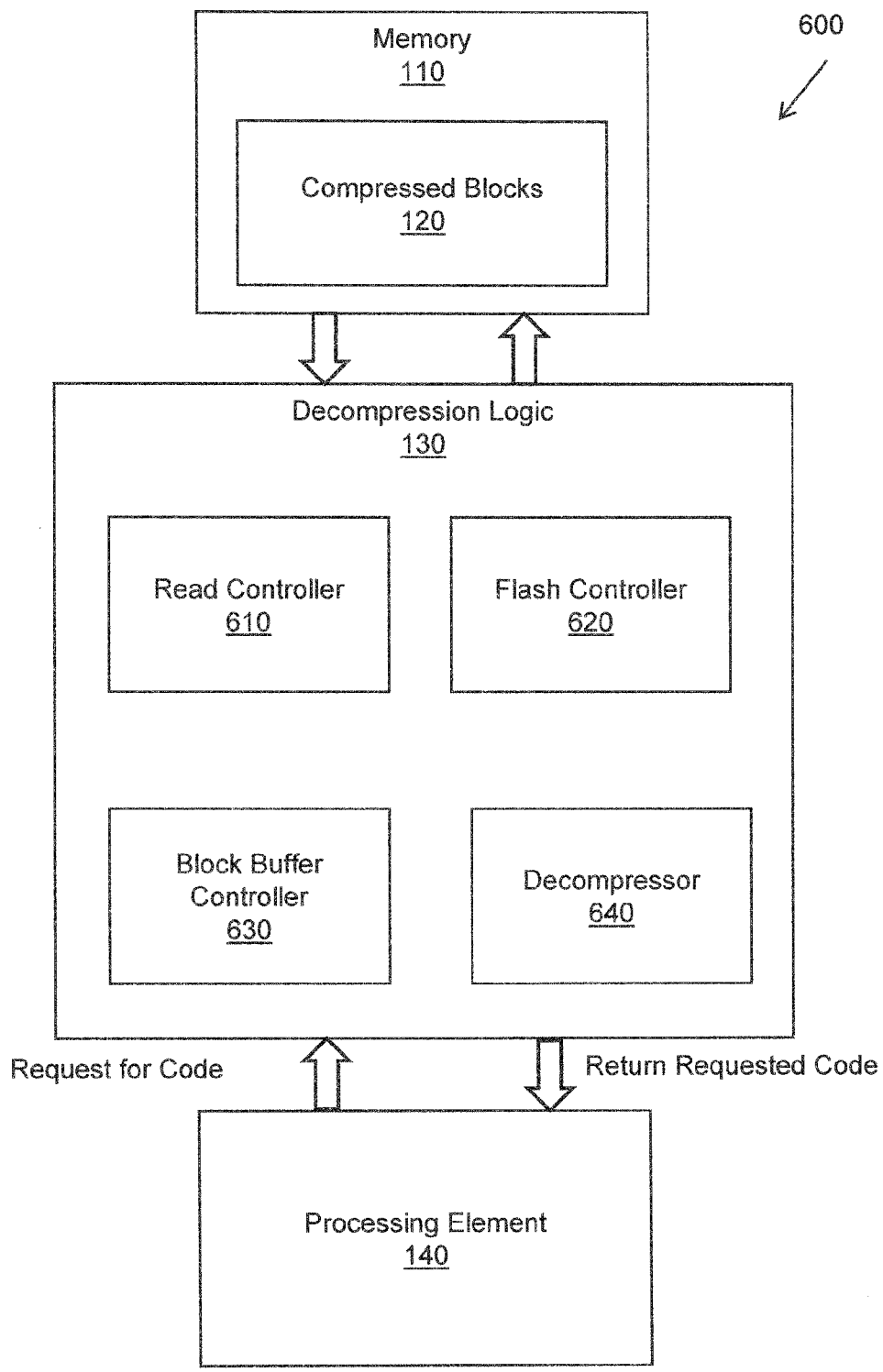
FIG. 6 illustrates one embodiment of an apparatus for real-time decompression of executable code.

FIG. 6 illustrates one embodiment of an apparatus for real-time decompression of executable code. FIG. 6 includes the memory 110 having the compressed blocks 120 and the processing element 140 shown in FIG. 1. The memory 110 and the processing element 140 operate in a similar manner as described with respect to FIG. 1. The apparatus 600 also includes the decompression logic 130. The decompression logic includes a read controller 610, a flash controller 620, a block buffer controller 630, and a group decompressor 640.

The read controller 610 accepts requests from the processing element 140 for executable code. The executable code is stored in compressed blocks 120 in memory 110. However, the request from the processing element is not in terms of compressed blocks 120. Instead, the request is in terms of bytes of executable code. For example, the processing element 140 may request a 32-byte uncompressed block. The read controller 610 initiates a request to the block buffer controller 630 and/or the memory 110 for the compressed block storing the requested executable code.

The block buffer controller 630 stores decompressed blocks to provide a level of caching and reduce the frequency of requests to the memory 110. Although the processing element 140 may only request a portion of a compressed block, the entire compressed block, which may have a size ranging from 128-2048 bytes, is decompressed and stored in the block buffer controller 630. Thus, in the event that the processing element subsequently requests the next portion of the executable code from the decompressed compressed block, the executable code is already stored in the block buffer controller 630.

The block buffer controller 630 may be bifurcated into two buffers each able to store a decompressed block. Thus, the block buffer controller 630 may be configured to store two decompressed blocks. When a third block is decompressed, the decompressed block stored in the block buffer controller 630 last accessed for executable code is deleted, allowing the third decompressed block to be stored in its place in the block buffer controller 630. Any number of cache replacement schemes may be employed by the bock buffer controller 630 in selecting which decompressed blocks should be maintained in the buffers. Alternatively, if the block size is less than the size of the buffers, the block buffer controller 630 may be further divided to store a plurality of decompressed blocks in each buffer.

If a decompressed block storing the executable code is not in the block buffer controller 630, flash controller 620 proceeds by initiating a block lookup table request from the memory 110 to determine which of the compressed blocks 120 the executable is stored in (see, e.g., block lookup table 460 in FIG. 4). Once determining the location of the compressed block, the compressed block is retrieved from the memory 110. The flash controller 620 sends the retrieved compressed block to the decompressor 640 to be decompressed. The decompressed block storing the requested executable code is then stored in the block buffer controller 630. The flash controller 620 initiates a request for the requested executable code from the block buffer controller 630.

The decompressor 640 decompresses a compressed block that contains executable code that has been requested by the read controller 610 and is not already stored in the block buffer controller 630. The decompressor 640 holds a data stream of bits from a selected compressed block 120 from the memory 110 in a shift register. In one example, the shift register is a 24 bit shift register. The decompressor 640 decodes a data stream that has been subject to nibble encoding in the shift register starting at bit 11 and returns a 4 bit nibble of decoded data and a shift-left value. The shift-value indicates that the shift register is to be shifted to the left by a predetermined number of bits, such as 2 to 5. The decompressor 640 decodes data in the data stream that has not been subjected to nibble encoding in the shift register starting at bit 11 and returns a 5 bit length value and a shift-left value. The shift-value indicates that the shift register is to be shifted to the left by a predetermined number of bits. Once the data stream has been decoded, it is stored in the block buffer controller 630.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes but is not limited to hardware, firmware, instructions stored on a non-transitory medium or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics. One or more of the components and functions described herein may be implemented using one or more of the logic elements.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. An apparatus, comprising
a memory configured to store compressed blocks of data, wherein the data is executable code for a processing element; and
a decompression logic configured to:
receive a request from the processing element for data;
determine a compressed block that stores the data;
decompress the compressed block to produce an uncompressed block; and
provide the requested data to the processing element.

2. The apparatus of claim 1, wherein the decompression logic further comprises a block buffer controller configured to store a plurality of decompressed blocks and further wherein when the decompression logic determines that a decompressed block corresponding to the compressed block is stored in the block buffer controller, the decompression logic provides the decompressed block from the block buffer controller to the processing element.

3. The apparatus of claim 1, further comprising a compression logic configured to:
receive uncompressed data;
parse the uncompressed data into at least one uncompressed block;
compress the at least one uncompressed block into a compressed block; and
store the compressed block in the memory.

4. The apparatus of claim 3, wherein the at least one uncompressed block has a predetermined fixed block size, wherein the predetermined fixed block size is selected based on at least one of an amount of uncompressed data, a desired compression ratio, and a desired access time.

5. The apparatus of claim 3, wherein the compression logic further includes a copy bin, and wherein the compression logic is further configured to:
store a plurality of segments in the copy bin, wherein a segment comprises a sequence of bits of executable code;
select a given segment from the plurality of segments;
determine if the given segment is present in the copy bin, and when the given segment is present in the copy bin, iteratively augment the given segment with additional bits of executable code and determine if the augmented segment is present in the copy bin to determine a segment of maximum length that is present in the copy bin; and
store, in the compressed block, a pointer to a location of the segment of maximum length in the copy bin.

6. The apparatus of claim 3, wherein compression logic is configured to:
perform an initial compression on the at least one uncompressed block to form a partially compressed block; and
perform a second compression of the partially compressed block using a second compression technique to form a given compressed block.

7. The apparatus of claim 3, further comprising a block look up table logic that stores, for each uncompressed block of executable code:
a block number derived from an address of the at least one uncompressed block; and
an offset value indicative of the location of the corresponding compressed block in the memory.

8. The apparatus of claim 1, wherein the memory is a flash memory.

9. A method, comprising
storing data in compressed blocks, wherein the data is executable code for a processing element;
receiving a request from the processing element for data; and
determining a compressed block that stores the data;
decompressing the compressed block to produce an uncompressed block;
and providing the requested data to the processing element.

10. The method of claim 9, further comprising determining if the uncompressed block is already stored in a buffer and when the uncompressed block is stored in the buffer, providing the requested data from the buffer.

11. The method of claim 9, wherein uncompressed blocks are of a predetermined fixed block size, wherein the determining comprises dividing an address of the requested uncompressed block by the fixed block size to determine a block number that identifies a compressed block that stores the data.

12. The method of claim 11, wherein the determining comprises accessing a lookup table that stores, for each compressed block, a block number and an offset value indicative of the location of the corresponding compressed block in memory.

13. A method, comprising:
- selecting a pair of bits of uncompressed executable code;
- determining if the pair of bits has been previously copied to a copy bin; and
  - when the pair of bits has not been previously copied to the copy bin, copying the pair of bits to the copy bin; and
  - when the pair of bits has been previously copied to the copy bin, adding an additional bit to form a segment;
- determining if the segment has been previously copied to the copy bin; and
  - when the segment has not been previously copied to the copy bin, storing, in a compressed block, a pointer to a location of the pair of bits in the copy bin; and
  - when the segment has been previously copied, adding an additional bit to form a longer segment, until the longer segment is determined as not having been copied previously, and
- storing, in the compressed block, a pointer to the longest segment determined as having been previously copied to the copy bin.

14. The method of claim 13, wherein the pointer identifies where a last occurrence of the previously stored pair or longest segment is stored in the copy bin.

15. The method of claim 13, further comprising performing a compression of the compressed block using Huffman encoding.

16. The method of claim 15, wherein the Huffman encoding is performed using a preprogrammed Huffman table.

17. The method of claim 15, further comprising:
- performing nibble encoding on the compressed block;
- identifying frequently encoded nibbles; and
- generating a Huffman table based, at least in part on, the frequently encoded nibbles.

18. The method of claim 13, further comprising:
- receiving the executable code; and
- parsing the executable code into uncompressed blocks.

19. The method of claim 18, wherein the uncompressed blocks have a predetermined fixed block size, wherein the predetermined fixed block size is selected based on at least one of an amount of executable code, a desired compression ratio, and a desired access time.

20. The apparatus of claim 18, wherein the uncompressed blocks have a variable block size.

* * * * *